US009690571B2

(12) United States Patent
Scouller et al.

(10) Patent No.: US 9,690,571 B2
(45) Date of Patent: Jun. 27, 2017

(54) SYSTEM AND METHOD FOR LOW COST PATCHING OF HIGH VOLTAGE OPERATION MEMORY SPACE

(71) Applicant: FREESCALE SEMICONDUCTOR, INC., Austin, TX (US)

(72) Inventors: Ross S. Scouller, Austin, TX (US); Jeffrey C. Cunningham, Austin, TX (US); Christopher N. Hume, Kyle, TX (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 14/144,891

(22) Filed: Dec. 31, 2013

(65) Prior Publication Data

US 2015/0186049 A1    Jul. 2, 2015

(51) Int. Cl.
| | |
|---|---|
| *G06F 12/00* | (2006.01) |
| *G06F 12/06* | (2006.01) |
| *G06F 13/00* | (2006.01) |
| *G06F 13/28* | (2006.01) |
| *G06F 9/445* | (2006.01) |
| *G06F 3/06* | (2006.01) |
| *G06F 9/32* | (2006.01) |
| *G06F 9/24* | (2006.01) |

(52) U.S. Cl.
CPC ............ *G06F 8/665* (2013.01); *G06F 3/0617* (2013.01); *G06F 3/0644* (2013.01); *G06F 9/328* (2013.01); *G06F 3/0607* (2013.01); *G06F 3/0679* (2013.01); *G06F 9/24* (2013.01)

(58) Field of Classification Search
CPC .... G06F 3/0608; G06F 3/0644; G06F 3/0679; G06F 3/0617; G06F 3/0607; G06F 9/24; G06F 9/328; G06F 8/665
USPC ..................... 711/2, 102, 103, 115
See application file for complete search history.

(56) References Cited

U.S. PATENT DOCUMENTS

| | | | |
|---|---|---|---|
| 4,802,119 | A | 1/1989 | Heene et al. |
| 5,802,549 | A | 9/1998 | Goyal et al. |
| 5,901,225 | A | 5/1999 | Ireton et al. |
| 6,073,252 | A | 6/2000 | Moyer et al. |
| 6,865,667 | B2 | 3/2005 | Moyer et al. |
| 2003/0009607 | A1* | 1/2003 | Chen .................. G06F 8/65 710/1 |
| 2011/0145472 | A1* | 6/2011 | Whitehouse et al. ........ 711/103 |
| 2011/0271041 | A1* | 11/2011 | Lee ..................... G06F 12/0246 711/103 |

(Continued)

*Primary Examiner* — Mark Giardino, Jr.
*Assistant Examiner* — Shane Woolwine

(57) ABSTRACT

A low semiconductor area impact mechanism for patching operations stored in a boot memory area is provided, thereby providing flexibility to such code. In this manner, current flash memory manager SCRAM, which is used for memory operations when the flash memory is unavailable can be replaced with a significantly smaller register area (e.g., a flip flop array) that provides a small patch space, variable storage, and stack. Embodiments provide such space saving without modification to the CPU core, but instead focus on the external flash memory manager. Patch code can be copied into a designated register space. Since such code used during flash memory inaccessibility is typically small, patching is provided for just a small area of the possible flash memory map, and program flow is controlled by presenting the CPU core's own address to redirect the program counter to the patch area.

11 Claims, 2 Drawing Sheets

(56) References Cited

U.S. PATENT DOCUMENTS

2013/0124888 A1\* 5/2013 Tanaka et al. ................ 713/320
2014/0149643 A1\* 5/2014 Devinoy et al. ............. 711/103

\* cited by examiner

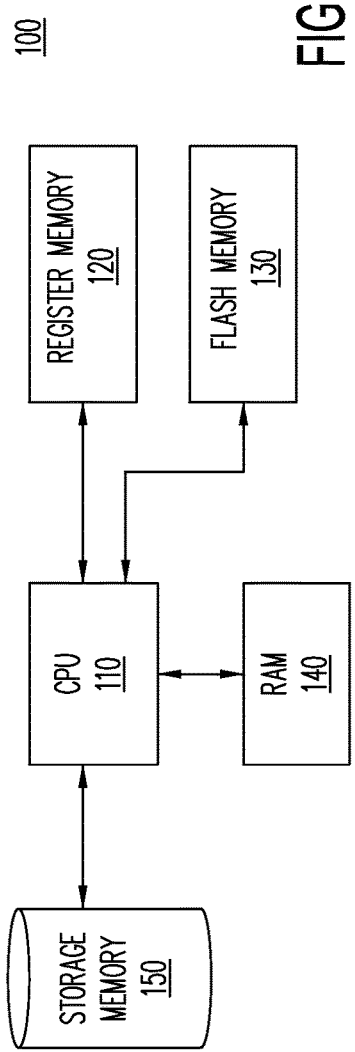
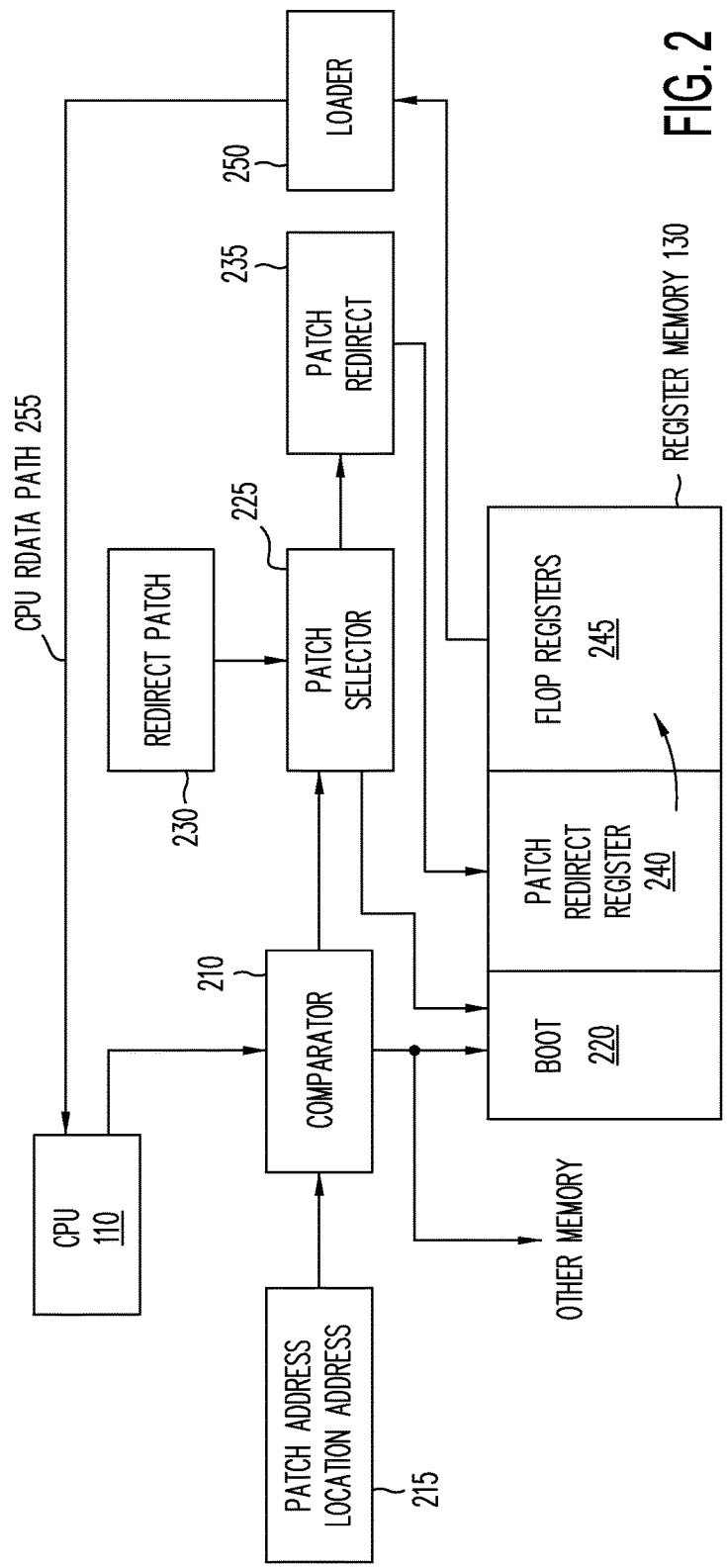

SYSTEM AND METHOD FOR LOW COST PATCHING OF HIGH VOLTAGE OPERATION MEMORY SPACE

BACKGROUND

Field

This disclosure relates generally to firmware memory management, and more specifically, to patching firmware used during program/erase and other high voltage operations of a flash memory.

Related Art

Semiconductor systems often include one or more processor cores with a variety of coupled memories. Typically, one of those memories is a flash that contains firmware used by the processor cores for operational configuration. Often reducing the size of the semiconductor system is important for particular applications in which the semiconductor system is to be included.

In low-cost, flash memory management operations, reducing the semiconductor area consumed by the flash memory can be important. One of the largest overheads in a flash memory management unit is a requirement for SCRAM memory for code execution, variables, and CPU stack during certain operations when the flash memory is inaccessible (e.g., program/erase high voltage operation). SCRAM memory area has typically been reduced using methods such as code optimization and paging schemes.

SCRAM can be replaced with an array of flip flops, but current SCRAM memory utilization schemes cannot reduce the needed SCRAM memory size to a point where an array of flip flops consumes less semiconductor area. Another alternative to SCRAM for storage of those commands needed during periods of flash inaccessibility is to utilize fixed firmware stored either in registers or read-only memory. A disadvantage of this memory area is that the code is permanently stored in those locations, thereby losing the flexibility provided by use of SCRAM space.

It is therefore desirable to store code used during flash memory inaccessible periods in a space-efficient manner, while at the same time providing flexibility to modify that code should the need arise, such as, for example, during firmware modification.

BRIEF DESCRIPTION OF THE DRAWINGS

The present invention may be better understood, and its numerous objects, features, and advantages made apparent to those skilled in the art by referencing the accompanying drawings.

FIG. 1 is a simplified block diagram illustrating a CPU core and memory configuration, usable with embodiments of the present invention.

FIG. 2 is a simplified block diagram illustrating an example memory system providing patching capabilities of embodiments of the present invention.

The use of the same reference symbols in different drawings indicates identical items unless otherwise noted. The figures are not necessarily drawn to scale.

DETAILED DESCRIPTION

Figure 3:
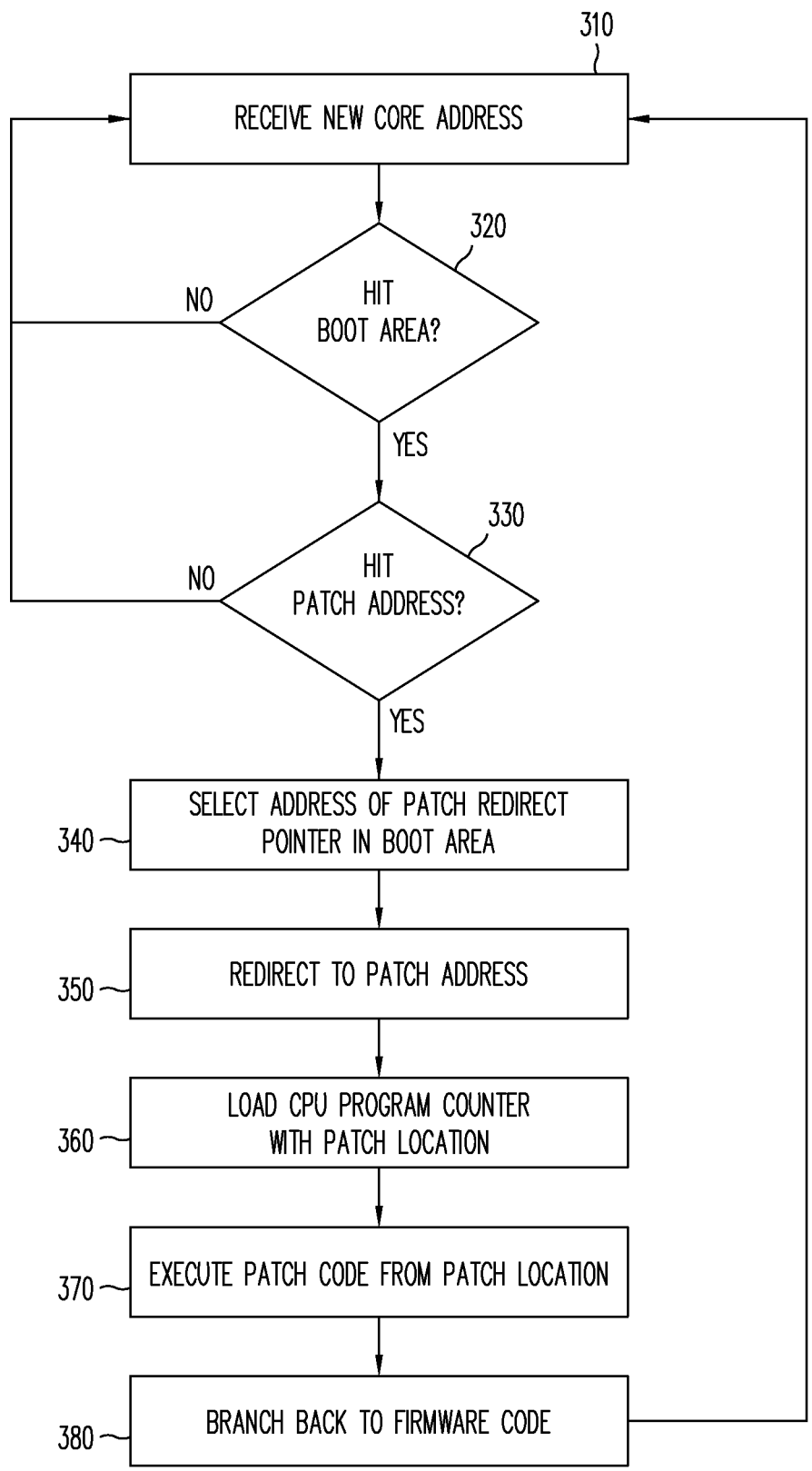
FIG. 3 is a simplified flow diagram illustrating a method for providing the patches, in accord with embodiments of the present invention.

A low semiconductor area impact mechanism for patching operations stored in a boot memory area is provided, thereby providing flexibility to such code. In this manner, current flash memory manager SCRAM, which is used for memory operations when the flash memory is unavailable (e.g., high voltage operations) can be replaced with a significantly smaller register area (e.g., a flip flop array) that provides a small patch space, variable storage, and stack. Embodiments provide such space saving without modification to the CPU core, but instead focus on the external flash memory manager. Patch code can be copied into a designated register space. Since such code used during flash memory inaccessibility is typically small, patching can be provided for just a small area of the possible flash memory map, and program flow can be controlled by presenting the CPU core's own address to redirect the program counter to the patch area.

FIG. 1 is a simplified block diagram illustrating a CPU core and memory configuration, usable with embodiments of the present invention. CPU core 110 is coupled to several memory devices usable for differing operations. For example, CPU core 110 can be coupled to a register memory 120 that provide boot or reset operations to the CPU upon a system restart. Typically such memory includes a small number of hard coded instructions containing op-codes for the CPU to execute during a time of system reset, and before accessibility of additional memory resources. One such additional memory resource is flash memory 130. Flash memory 130 can be include NOR-type flash or a NAND-type flash, and can be an on chip flash, or an external serial flash. Flash memory 130 can be used in conjunction with a fast random access memory (e.g., RAM 140) to store transfer device firmware into the RAM, which is then more rapidly accessed by the CPU. Alternatively, the flash can directly provide the firmware operations to the CPU upon command. Finally, a storage memory 150 can be coupled to the CPU. Such a storage memory can include, for example, hard drive storage units, solid state drives, optical drives, memory arrays, and the like. Although, each of the memory devices is illustrated as independently coupled to CPU 110, an alternative coupling uses a bus from which one or more of the memory devices is coupled to the CPU and to one another.

Flash memory 130 can be used to store firmware for CPU core 110. But there are times when flash memory is typically not accessible for read operations like when the flash is operating in a non-executable mode, for example, during high voltage operations such as program and erase. Certain firmware op-codes are needed by the CPU core during those time, and therefore those op-codes are stored outside the flash memory. In a typical system, those op-codes can be stored in a RAM (e.g., SCRAM), for example, which can take up significant space on the silicon. An alternative is to store the firmware op-codes in boot area memory, but a disadvantage to this is that such memory is typically not modifiable. Embodiments of the present invention provide a mechanism to store patches to the boot area memory stored firmware op-codes in additional register memory, and to further provide the patch op-codes to the CPU core requesting them.

FIG. 2 is a simplified block diagram illustrating an example memory system providing patching capabilities of embodiments of the present invention. FIG. 3 is a simplified flow diagram illustrating a method for providing the patches.

A CPU core 110 can issue a read request for firmware instructions using a core address. The read request is received by comparator circuitry 210 (310), which compares the core address with one or more patch address location addresses 215 in order to determine whether the core address is within a possible patch area. In one embodiment, the possible patch area is a portion of boot register memory 130 (320). As discussed above, the boot register memory can be provided with the limited number of firmware instructions needed for high voltage type operations of the flash memory (e.g., during program and erase of the firmware). The boot register memory provides a small silicon area footprint for the relatively limited number of firmware instructions needed for this type of operation. Comparator 210 then only compares against a limited number of possible addresses, and such comparison can proceed quickly enough to perform such comparison against every read request from the CPU core. Should the requested core address not correspond to a memory address that is potentially patched, the comparator will pass the memory request to the appropriate memory (e.g., register memory, RAM, or the flash memory), and then wait for another core address request.

Once a determination is made by comparator 210 that the requested core address is in a potentially patched location, the request can be passed to patch selector circuitry 225 that determines whether the specific core address corresponds to a patched memory location as specified by a redirect patch address 230 (330). Should the core address not correspond to a patched memory address, the patch selector circuitry will pass the memory request to the appropriate memory (e.g., register memory 130), and then wait for another core address to compare against. Should the core address correspond to a patched location (330), then a new address is selected that points to a fixed location within register memory 130 (340) and substituted for the specified core address.

Patch redirect circuitry 235 then directs the memory request to the fixed location address (e.g., patch redirect register 240) (350). Patch redirect register 240 can store op-codes that load up a flop register address (e.g., in flop registers 245) that contain the actual patch op-codes corresponding to the originally called core address. The patch location, that is the flop register address, is loaded to the CPU core program counter by, for example, loader circuitry 250 (360). Loader circuitry 250 can use the CPU core's own instructions to redirect to the patch area. For example, a CPU internal register can be loaded with the patch address using an assembly load command such as LDW. The program counter can be loaded with the CPU internal register with the patch location using an assembly transfer command such as TFR. Such a command will redirect the program counter itself with the instruction, as opposed to trying the modify the addresses generated by the program counter. In this manner, since such load and transfer commands are broadly applicable to a variety of processor cores, embodiments of the present invention can be implemented for use with many processor core types.

Once the flop register addresses 245 containing the patches for the originally called core address are loaded to the CPU core program counter, the program counter can execute the op-codes from the patch location (370). Once executed, the patch can be exited back to the original firmware code to the location from which the core address was originally called or to a selected location in the firmware code (380).

By now it should be appreciated that there has been provided a system that provides a low cost impact mechanism for providing a patching of high voltage or non-executable mode firmware memory space. The system includes a processor configured to request a memory address and memory access circuitry, external to the processor, and coupled to the processor. The memory access circuitry is configured to determine whether the requested memory address corresponds to an address of a patch for the requested memory address, and load a program counter of the processor with the address of the patch in place of instructions at the requested memory address.

In one aspect of the above embodiment, the memory access circuitry further includes comparator circuitry and patch selector circuitry. The comparator circuitry is configured to compare the requested memory address with a patch address location address. The patch selector circuitry is configured to provide a patch redirect register address in response to the memory address matching the patch address location address. The patch redirect register address provides the address of the patch for the requested memory address. In a further aspect, the system includes a register memory that includes the patch redirect register and the address of the patch for the requested memory address. In a still further aspect, the register memory includes one or more boot memory registers. In another further aspect, the memory access circuitry further includes loader circuitry that is configured to provide the address of the patch for the requested memory address to the processor.

In another aspect of the above embodiment, the requested memory address is included in firmware executable by the processor. In a further aspect, the system further includes a flash memory configured to store a first subset of the firmware, and a register memory separate from the flash memory. The register memory stores a second subset of the firmware in which the requested memory address is stored. In a still further aspect, the second subset of the firmware is configured for access by the processor during a period when the flash memory is operating in a non-executable mode, such as program or erase mode. In another further aspect, the second subset of the firmware is configured for access by the processor during a period when the flash memory is operating in a high-voltage mode.

Another embodiment of the present invention provides a method, executed by a memory access circuitry external to a processor, for providing a patch for a firmware memory location. The method includes receiving a request for a memory access from the processor, determining whether the requested memory address corresponds to an address of a patch for the requested memory address, and loading a program counter of the processor with the addresses of the patch for the requested memory address.

In one aspect of the above embodiment, the determining whether the requested memory address corresponds to the address of the patch for the requested memory address further includes comparing the requested memory address with a patch address location address, and providing a patch redirect register address in response to the memory address matching th patch address location address. The patch redirect register address provides the address of the patch for the requested memory address, where a register memory includes the patch redirect register and the address of the patch for the requested memory address. In a further aspect, the method includes providing the address of the patch for the requested memory address to the processor.

In another aspect of the above embodiment, the requested memory address is included in firmware executable by the processor. In a further aspect, the method includes storing a first subset of the firmware in a flash memory, and storing a second subset of the firmware in a register memory separate from the flash memory, where the requested memory address is a member of the second subset. In a still further aspect, the method includes operating the flash memory in a non-executable mode, and accessing the second subset of the firmware during a period when the flash memory is operating in the non-executable mode. The non-executable mode includes one of a program or an erase mode. In another further aspect, the method includes operating the flash memory in a high voltage mode, and accessing the second subset of the firmware during a period when the flash memory is operating in the high voltage mode.

Another embodiment provides a system on a chip that includes a processor configured to request a memory address, a memory coupled to the processor, and memory access circuitry. The memory is configured to store firmware executable by the processor. The memory includes a flash memory configured to store a first subset of the firmware, a register memory configured to store a second subset of the firmware, and the second subset of the firmware includes the requested memory address and a patch for the requested memory address. The memory access circuitry is configured to provide a program counter of the processor with the address of the patch in place of instructions at the requested memory address, in response to the request for the memory address.

In one aspect of the above embodiment, the memory access circuitry includes a comparator configured to compare the requested memory address with a patch address location address, and a patch selector configured to provide a patch redirect register address in response to the memory address matching the patch address location address. The patch redirect register address provides the address of the patch for the requested memory address. In a further aspect, the system further includes a register memory configured to store the patch redirect register and the address of the patch for the requested memory address. In another further aspect, the memory access circuitry includes loader circuitry configured to provide the address of the patch for the requested memory address to the processor.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 100 are circuitry located on a single integrated circuit or within a same device. Alternatively, system 100 may include any number of separate integrated circuits or separate devices interconnected with each other. For example, RAM 140 may be located on a same integrated circuit as CPU 110 or on a separate integrated circuit or located within another peripheral or slave discretely separate from other elements of system 100.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of system 100, for example, from computer readable storage media such as flash memory 130 or register memory 120 or other media on other computer systems. Such computer readable storage media may be permanently, removably or remotely coupled to an information processing system such as system 100. The computer readable storage media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In one embodiment, system 100 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system.

A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A system comprising:
   a processor configured to request a memory address, wherein the memory address comprises firmware executable by the processor;
   memory access circuitry, external to the processor, and coupled to the processor, and configured to
      determine whether the requested memory address corresponds to an address of a patch for the requested memory address, and
      load a program counter of the processor with the address of the patch in place of instructions at the requested memory address;
   a flash memory configured to store a first subset of the firmware; and
   a register memory separate from the flash memory and configured to store a second subset of the firmware, wherein
      the requested memory address is stored in the register memory, and
      the register memory is configured for access only when the flash memory is unavailable for read access, wherein the flash memory and the register memory are configured to provide data corresponding to the requested memory address to the processor in response to the request for the memory address.

2. The system of claim 1 wherein the memory access circuitry comprises:
   comparator circuitry configured to compare the requested memory address with a patch address location address;
   patch selector circuitry configured to provide a patch redirect register address in response to the memory address matching the patch address location address, wherein
      the patch redirect register address provides the address of the patch for the requested memory address.

3. The system of claim 2 further comprising a register memory wherein the register memory comprises the patch redirect register and the address of the patch for the requested memory address.

4. The system of claim 3 wherein the register memory further comprises one or more boot memory registers.

5. The system of claim 2 wherein the memory access circuitry further comprises:
   loader circuitry configured to provide the address of the patch for the requested memory address to the processor.

6. The system of claim 1 wherein the second subset of the firmware is configured for access by the processor during a period when the flash memory is operating in a non-executable mode comprising one of program or erase mode.

7. The system of claim 1 wherein the second subset of the firmware is configured for access by the processor during a period when the flash memory is operating in a high voltage mode.

8. A system on a chip, the system comprising:
   a processor configured to request a memory address;
   a memory, coupled to the processor, and configured to
      store firmware executable by the processor, wherein the memory comprises
         a flash memory configured to store a first subset of the firmware,
         a register memory configured to store a second subset of the firmware, and
         the second subset of the firmware comprising the requested memory address and a patch for the requested memory address; and
   memory access circuitry, coupled to the memory and the processor, and configured to provide a program counter of the processor with the address of the patch in place of instructions at the requested memory address, in response to the request for the memory address, wherein
      the register memory is configured for access only when the flash memory is unavailable for read access, and
      the flash memory and the register memory are configured to provide data corresponding to the requested memory address to the processor in response to the request for the memory address.

9. The system of claim 8 wherein the memory access circuitry comprises:
   a comparator configured to compare the requested memory address with a patch address location address; and
   a patch selector configured to provide a patch redirect register address in response to the memory address matching the patch address location address, wherein the patch redirect register address provides the address of the patch for the requested memory address.

10. The system of claim 9 further comprising a register memory configured to store the patch redirect register and the address of the patch for the requested memory address.

11. The system of claim 8 wherein the memory access circuitry further comprises loader circuitry configured to provide the address of the patch for the requested memory address to the processor.

* * * * *